US010423541B1

(12) United States Patent
Levin et al.

(10) Patent No.: US 10,423,541 B1
(45) Date of Patent: Sep. 24, 2019

(54) USING ENCRYPTION WITHIN A COMPUTING SYSTEM

(71) Applicant: Amazon Technologies, Inc., Seattle, WA (US)

(72) Inventors: Alex Levin, Cupertino, CA (US); Ron Diamant, Albany, CA (US); James Christopher Sorenson, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 15/388,472

(22) Filed: Dec. 22, 2016

(51) Int. Cl.
*G06F 12/14* (2006.01)
*G06F 11/30* (2006.01)
*G06F 21/72* (2013.01)
*G06F 12/1009* (2016.01)
*G06F 12/0802* (2016.01)

(52) U.S. Cl.
CPC ...... *G06F 12/1408* (2013.01); *G06F 12/0802* (2013.01); *G06F 12/1009* (2013.01); *G06F 21/72* (2013.01); *G06F 2212/1052* (2013.01); *G06F 2212/402* (2013.01); *G06F 2212/60* (2013.01)

(58) Field of Classification Search
CPC ............. G06F 12/1408; G06F 12/0802; G06F 12/1009; G06F 21/72; G06F 2212/1052; G06F 2212/402; G06F 2212/60
USPC ........................................................ 713/193
See application file for complete search history.

(56) References Cited

U.S. PATENT DOCUMENTS

| 8,356,184 B1* | 1/2013 | Meyer | G06F 21/79 711/100 |
| 2010/0042824 A1* | 2/2010 | Lee | G06F 21/6218 713/2 |
| 2015/0106560 A1* | 4/2015 | Perego | G06F 12/10 711/105 |
| 2015/0161059 A1* | 6/2015 | Durham | G06F 12/1408 713/193 |
| 2016/0085692 A1* | 3/2016 | Kwok | G06F 12/1408 713/193 |

OTHER PUBLICATIONS

Patrick Colp; Protecting Data on Smartphones and Tablets from Memory Attacks; ACM (Year: 2015).*

* cited by examiner

*Primary Examiner* — Monjur Rahim
(74) *Attorney, Agent, or Firm* — Klarquist Sparkman, LLP (57) ABSTRACT

The following description is directed to the use of encryption by a computing system. In one example, a method can include determining whether information associated with a logical address is stored unencrypted within an on-chip memory of an integrated circuit or whether the information associated with the logical address is stored encrypted within an off-chip memory external to the integrated circuit. When the information is not stored unencrypted within the on-chip memory and is stored encrypted within the off-chip memory: a page associated with the logical address can be retrieved from the off-chip memory containing the encrypted information; the retrieved page can be decrypted to generate unencrypted information; and the unencrypted information can be stored in a frame of the on-chip memory.

20 Claims, 9 Drawing Sheets

USING ENCRYPTION WITHIN A COMPUTING SYSTEM

BACKGROUND

Embedded computing systems, such as those used to implement devices for the Internet of Things, can be widely distributed to consumers outside the control of the system developer. The devices can include proprietary data, proprietary code, and personal data of users of the device. For example, the proprietary data can include cryptographic keys for encrypting and decrypting data or for accessing network-accessible services. The proprietary code can include software instructions for implementing the functionality of the device. One method for protecting proprietary and personal information is to use cryptographic techniques to encrypt the information. Encrypted information is encoded such that the information generally cannot be understood unless the encrypted information is first decrypted with a decryption key. Thus, an embedded computing system using encryption can protect the personal data of users and the proprietary data and code of the developer.

DETAILED DESCRIPTION

Overview

Developers of embedded computing systems using encryption can choose to implement the encryption functionality in various different ways. As one example, a small subset of the information stored on the computing system can be encrypted. Specifically, cryptographic keys and/or some of the personal data, such as account information, can be encrypted while other information used by the system remains unencrypted. By encrypting a small portion of the information of the system, the majority of the processing resources of the system can be used for performing the functionality of the system and a smaller amount of processing resources can be used for encrypting and/or decrypting data. Thus, a system using selective or partial encryption may have higher performance and/or lower power than a system using more complete encryption. However, the security of such a system may be compromised because much of the data is not encrypted and the encryption and/or decryption may be observed using reverse engineering or hacking techniques.

A potentially weak area for security can be an interface between a system on a chip (SOC) and external memory, such as dynamic random access memory (DRAM). Specifically, the interface can include electrical signal lines that can be observed when a device is reverse engineered or observed. In contrast, the components and the signal lines between the different components of the SOC (the components of the SOC can be referred to as the on-chip components) cannot be easily observed because they are encapsulated within a package and potentially within the layers of an integrated circuit (IC). The signal lines of an IC can have small geometries (such as 14 nanometers) and are not readily identifiable. Thus, it can be outside the capabilities or prohibitively expensive for a hacker to observe the signal lines within the SOC. The on-chip components of an SOC can include a processor, one or more caches, scratchpad RAM, and various hardware accelerators. The external DRAM is the primary storage location for program instructions and data. The caches can hold temporary copies of the program instructions and data, but the contents of the caches can be written out to the DRAM where the data can be observed. Thus, a more secure system can encrypt all of the data external to the SOC.

As one example, an SOC can include hardware for encrypting all of the data being written to DRAM and for decrypting all of the data being read from the DRAM. In particular, a pipeline stage or stages for performing cryptographic functions can be inserted in the transfer path between the caches and the DRAM. Thus, the data stored in the DRAM can be protected and the security of the DRAM-SOC interface can be protected. However, the additional pipeline stages can increase the cost of the SOC because the SOC can be larger (to accommodate the additional hardware of the pipeline stages) and because there may be a more limited market for the SOC so that the fixed costs of production may be a larger proportion of the SOC's cost. Thus, adding cryptographic pipeline stages between the DRAM and caches may make a system uncompetitively priced. Additionally, pipeline stages cannot be added to SOCs that are already fabricated, so there is no way to retrofit this solution onto existing SOCs.

As described herein, a computing system can encrypt data that is transferred between an integrated system (such as an IC or an SOC) and an external memory (e.g., DRAM) without using dedicated cryptographic hardware between the DRAM and the caches. Specifically, the computing system can use a memory hierarchy where a level of the hierarchy is interspersed between the caches and the external memory. For example, the level of the hierarchy can correspond to an integrated memory, such as a scratchpad memory. Processing within the integrated system can be performed using unencrypted data. However, when data spills from the integrated memory, it can be encrypted and stored in the external memory so that the external memory can perform a function of a first stage of swap space. External data can be retrieved, decrypted, and stored in the integrated memories on demand, as the data is needed. In one embodiment, existing pre-fabricated systems can be retrofitted for increased security by replacing a standard pager component of an operating system (OS) kernel with the disclosed pager that utilizes the new memory hierarchy. In this manner, the security of new and/or existing systems can potentially be increased using relatively inexpensive hardware.

Example System Architectures

Figure 1:
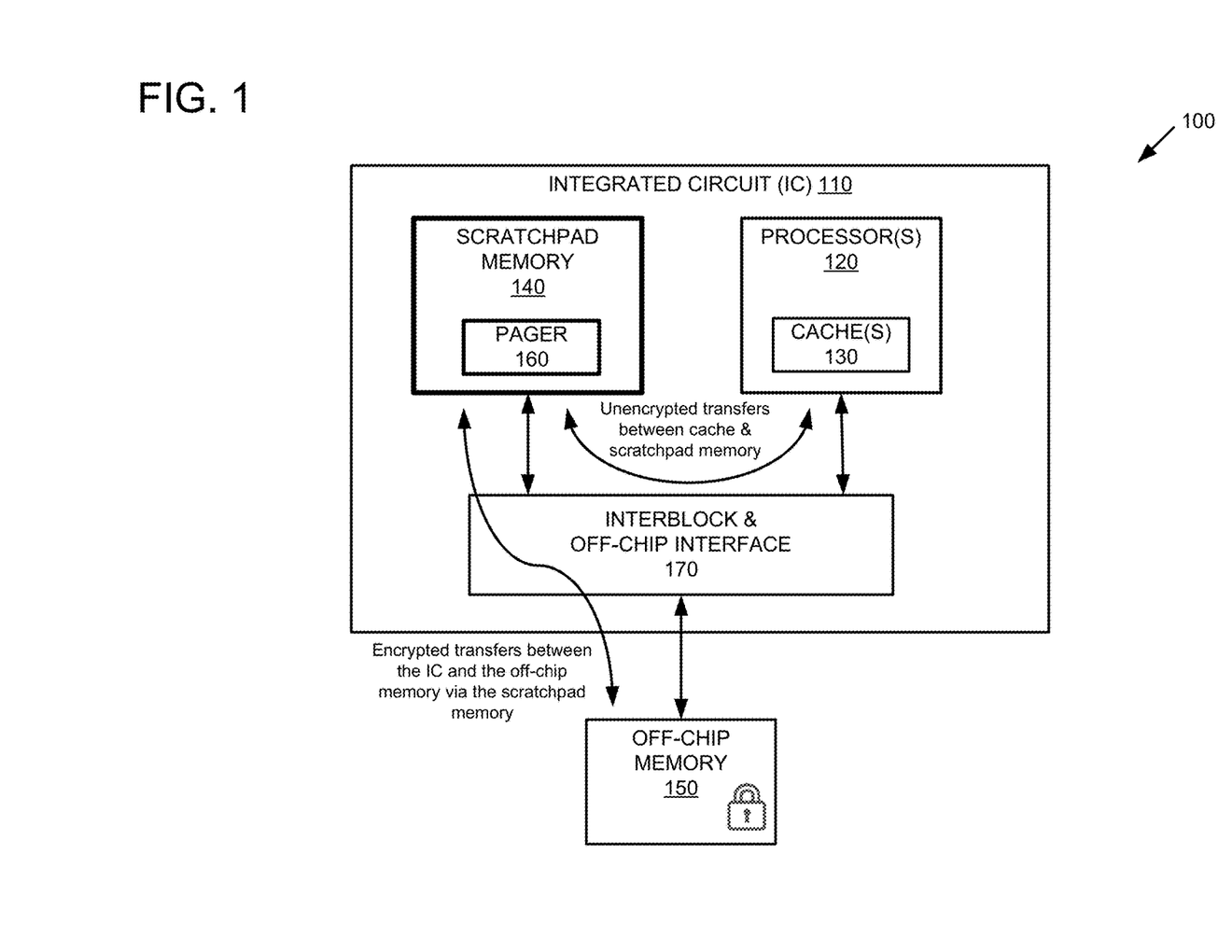
FIG. 1 is a system diagram showing an example of a computing system including a memory hierarchy that supports encrypted and unencrypted transfers of information.

FIG. 1 is a system diagram showing an example of a computing system 100 including a memory hierarchy that supports encrypted and unencrypted transfers of information. Encryption is a method for potentially protecting confidential data. Encryption can include using a cryptographic algorithm to encode data such that the information in the data generally cannot be understood unless the encrypted data is first decrypted with a decryption key. For example, one or more keys can be used to encrypt the configuration data using a cryptographic algorithm. A "key" is a number that can vary in length depending on the cryptographic algorithm. Exemplary cryptographic algorithms can be symmetric or asymmetric. For a symmetric algorithm, the same key can be used for encryption and decryption of the data. In other words, a symmetric key can function as both an encryption key and a decryption key for the data. It is desirable to safeguard a symmetric key because anyone having access to the key can potentially decrypt data that has been encrypted using the key. Symmetric algorithms can be based on stream ciphers or block ciphers. Examples of symmetric cryptographic algorithms include Advanced Encryption Standard (AES), Data Encryption Standard (DES), triple-DES, Twofish, Serpent, Blowfish, and CAST-128. For an asymmetric algorithm, a public key can be used for encryption and a private key can be used for decryption of data. The public key and the private key form a key pair, where the public key and the private key are mathematically related. The public encryption key can be freely accessible since it can only be used to encrypt data, but it is desirable to safeguard the private decryption key since it can be used to potentially decrypt the data. Examples of asymmetric cryptographic algorithms can include the RSA algorithm or an algorithm based on elliptic curve cryptography.

A memory hierarchy can be used to potentially increase the speed of accessing data stored in the memory. A memory hierarchy includes multiple levels of memory having different speeds and sizes. Levels within or closer to a processor (such as the processor 120) are generally faster and smaller than levels farther from the processor. Generally, a memory hierarchy can include a level-one (L) cache within a processor, a level-two (L2) cache within or external to the processor, main memory that is off-chip or external to the processor, and backing store that is located on a storage device, such as a hard-disk drive. Data can be copied from a slower level of the hierarchy to a faster level of the hierarchy when the data will be or is likely to be used by a processor. The data can be copied in blocks or lines that contain multiple words of data corresponding to a range of memory addresses. In a system that does not use an encrypted main memory, a memory line can be copied or fetched from main memory into an L2 and/or L1 cache to increase the execution speed of instructions that access memory locations within the memory line. In a system using an encrypted main memory, an encrypted memory line can be fetched from the main memory, decrypted, and then copied to the L2 and/or L1 cache. A principle of locality indicates that a program tends to use memory locations that are close to other memory locations used by the program (spatial locality) and that a given memory location is likely to be used multiple times by the program within a short time period (temporal locality). Thus, copying an unencrypted memory line associated with an address of one instruction into a high-speed cache may also increase the execution speed of other instructions that access other locations within the cached memory line. However, the faster levels of the memory hierarchy likely have reduced storage capacity compared to the slower levels of the memory hierarchy. Thus, copying a new memory line into the cache will typically cause a different memory line to be displaced or evicted. If the evicted line has been modified, the line can be encrypted and written back to the main memory.

The computing system 100 can include an integrated circuit (IC) 110 and an off-chip memory 150. The IC 110 can include one or more processor(s) 120, one or more caches(s) 130, a scratchpad memory 140, and an inter-block and off-chip interface 170. The off-chip memory 150 can include volatile memory (e.g., dynamic random access memory (DRAM) or static random access memory (SRAM)), non-volatile memory (e.g., ROM, EEPROM, FLASH memory, and so forth), and/or any other medium which can be used to store information in a non-transitory way and which can be accessed by the processor 120. The inter-block and off-chip interface 170 includes logic (e.g., programmable and/or hardwired digital logic circuitry) that allows the different on-chip and off-chip components to communicate with each other. For example, the processor 120 can communicate with the scratchpad memory 140 using signal lines and a protocol of the inter-block and off-chip interface 170. The signal lines for communicating among the on-chip components can be encapsulated within the IC 110. The processor 120 can communicate with the off-chip memory 140 using different signal lines and/or protocols of the inter-block and off-chip interface 170. The signal lines for communicating between the IC 110 and the off-chip memory 150 can be accessible from outside of the IC 110.

The processor 120 can execute computer-executable instructions to perform various tasks of software programs or routines. Specifically, the processor 120 can execute unencrypted instructions. The levels of the memory hierarchy closer to the processor 120 (e.g., the caches 130) can store unencrypted information (e.g., instructions and data) and the levels of the memory hierarchy farther from the processor 120 (e.g., the off-chip memory 150) can store encrypted information. The scratchpad memory 140 can be used as a level of the memory hierarchy dividing the unencrypted levels from the encrypted levels. Generally, the scratchpad memory 140 can be used to receive encrypted data from the off-chip memory 150, the encrypted data stored in the scratchpad memory 140 can be decrypted, and the unencrypted data can be copied from the scratchpad memory 140 to levels closer to the processor 120. Additionally, unencrypted data can be written back from the levels closer to the processor 120 to the scratchpad memory 140, the unencrypted data can be encrypted, and the encrypted data can be written back to the off-chip memory 150. The process described above can be distinguished from a conventional embedded system, where the storage locations of a scratchpad memory are typically uncacheable and transfers within the memory hierarchy are made directly between caches and the external memory.

The transfers within the memory hierarchy of the system 100 can be managed using a pager 160. The pager 160 can be software, hardware, or a combination of hardware and software executing on the IC 110. As illustrated, the pager 160 can be software that is loaded into the scratchpad memory 140. Alternatively, the pager 160 can be loaded in a nonvolatile memory (not shown) of the IC 110 or the pager 160 can be a dedicated hardware functional unit (not shown) of the IC 110. Generally, the pager 160 can maintain a data structure that tracks the location of information within at least a portion of the memory hierarchy. For example, the pager 160 can maintain one or more page tables that describe where blocks of information are located within a set of levels of the memory hierarchy. A page table can have partially complete information as hardware structures can be used to maintain location information for the layers of the memory hierarchy closest to the processor 120.

As one example, the processor 120 can generate a request to access information stored at an address. For example, the request can be a request to read information or a request to write information. The address can be a logical address (such as a virtual address) generated by the processor 120. A logical address can be mapped to a physical address, and a given logical address can be mapped to different physical addresses at different times (such as during different runs of the same program). The page table can specify the mapping between logical addresses and physical addresses. The pager 160 can receive the request to access information stored at a logical address, and can use the page table to determine whether the information is resident within the memory hierarchy. If the information is resident within the memory hierarchy, the pager 160 can determine where the information is resident. As one example, when the information is not resident in the caches 130 and is resident in the scratchpad memory 140, the pager 160 can cause a cache line associated with the logical address to be filled using the information stored in the scratchpad memory 140. As another example, when the information is not resident in the caches 130 or the scratchpad memory 140, the pager 160 can cause a read request to be issued to the off-chip memory 150. The read request can specify a page of encrypted information to read, where the page is associated with the logical address. The page of encrypted information can be received from the off-chip memory 150. As one example, the page of encrypted information can be stored in the scratchpad memory 140. The page of the encrypted information can be decrypted to generate unencrypted information. The unencrypted information can be stored in a frame of the scratchpad memory 140. The page table can be updated to indicate that the page of information associated with the logical address is stored in the frame of the scratchpad memory 140. The unencrypted information stored in the frame of the scratchpad memory 140 can be used to fill the cache line associated with the logical address so that the request generated by the processor 120 can be serviced. In this manner, the pager 160 can be used to modify a conventional memory hierarchy to potentially increase the security of the system 100 at a cost of slowing performance due to an extra layer (e.g., the scratchpad memory 140) of the memory hierarchy. Specifically, the pager 160 can be used to insert the scratchpad memory 140 between the cache(s) 130 and the off-chip memory 150 so that unencrypted data is transferred only within the integrated circuit 110 and does not pass outside of the integrated circuit 110 between the cache(s) 130 and the off-chip memory 150. Thus, unencrypted data can be prevented from passing directly between the cache(s) 130 and the off-chip memory 150.

Figure 2:
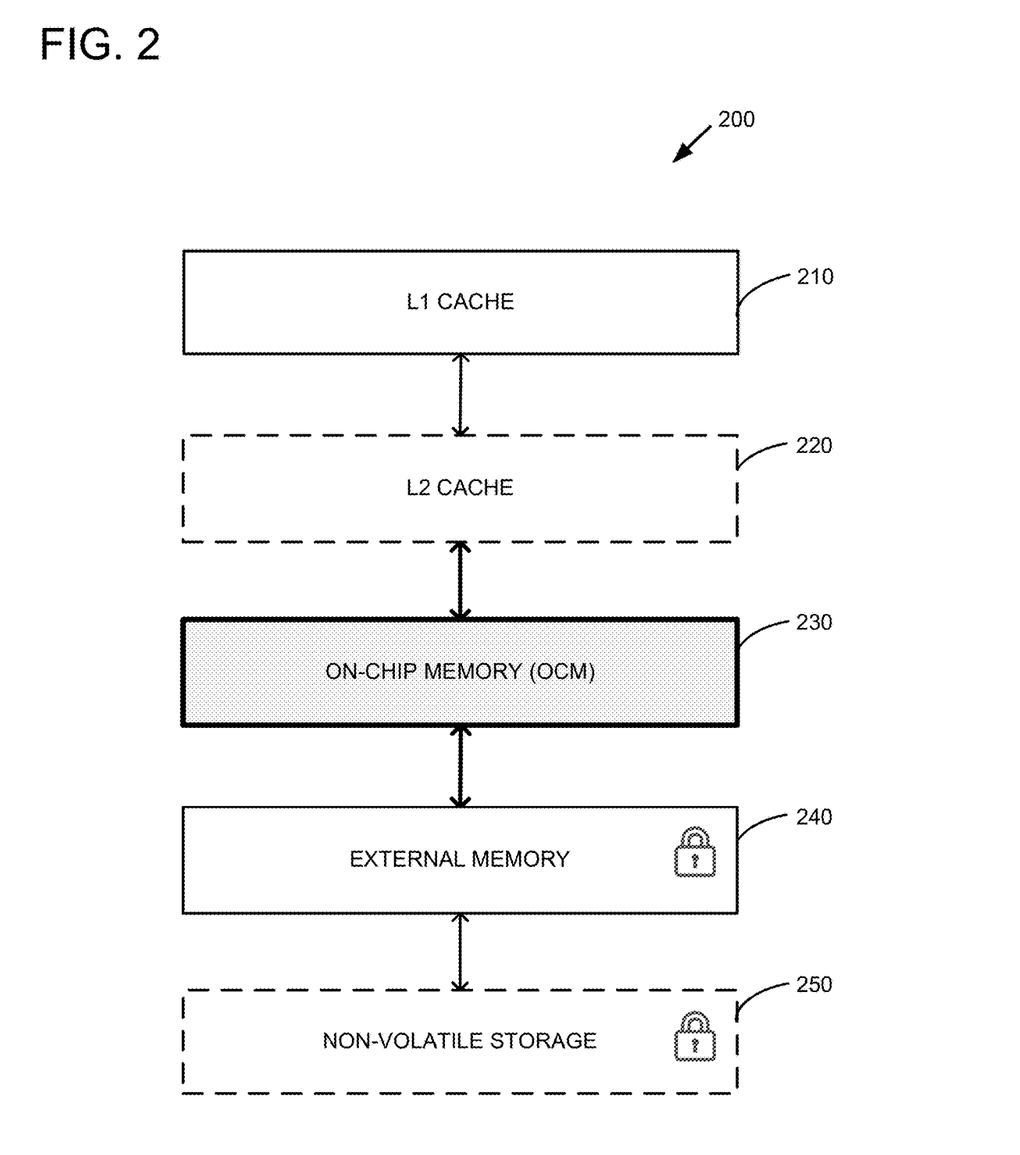
FIG. 2 illustrates aspects of an example of a memory hierarchy.

FIG. 2 illustrates aspects of an example of a memory hierarchy 200. The memory hierarchy 200 can be partitioned into a group of on-chip levels and a group of off-chip levels. The on-chip levels of the memory hierarchy 200 can include one or more caches (such as the L1 cache 210 and the L2 cache 220) and an on-chip memory 230 (such as a scratchpad memory). The off-chip levels of the memory hierarchy 200 can include external memory 240 and non-volatile storage 250. The levels of the memory hierarchy 200 closest to the processor (where the L1 cache 210 is closest to the processor) are generally smaller and faster than the levels adjacent to them and farther from the processor. For example, the L1 cache 210 is generally smaller and faster than the L2 cache 220, the L2 cache 220 is generally smaller and faster than the on-chip memory 230, and so forth.

Information can be copied between adjacent levels of the memory hierarchy 200. When information is transferred from a level farther from the processor to a level closer to the processor, the information can be stored in both levels. Thus, the levels closer to the processor (having less storage space) can include a subset of the information stored at the levels farther from the processor. However, the processor can modify the information stored in the lowest level of the hierarchy and so, depending on the write policy, the information at the lowest level may differ (it can be labelled as modified or dirty) from the information in a higher level. Because there is limited space in the lower levels of the memory hierarchy 200, the information in the lower levels can be spilled or evicted to make room for different information. If the information to be evicted is unmodified (e.g., it is labelled as clean) the information can be overwritten without losing any information. However, if the information to be evicted is modified, then the modified information can be copied to the level farther from the processor before it is overwritten so that the modifications can be saved. As a specific example, a block or line of information can be transferred from the L2 cache 220 to the L1 cache 210 when the processor first accesses the information. The processor can modify the information stored in the L1 cache 210 so that the cache line storing the information is dirty (e.g., the L cache 210 implements a write-back policy). The storage location corresponding to the dirty line can be identified as a storage location that can be used for different information (such as when the information has not been accessed relatively recently). However, prior to copying the different information into the L cache 210, the modified information can be copied to the L2 cache 220 so that the modifications are not overwritten.

The on-chip memory 230 can also be managed using a write-back policy, but writing the information back to the level farther from the processor (e.g., the external memory 240) is more involved because the on-chip memory 230 is at the boundary between unencrypted levels that are closer to the processor and encrypted levels that are farther from the processor. When information is initially brought into the on-chip memory 230 from a level farther from the processor, the information must be decrypted. The encrypted information can be stored in the same location of the on-chip memory 230 as the unencrypted information. For example, the encrypted information can be overwritten with the unencrypted information when it is decrypted. When the unencrypted information stored in the on-chip memory 230 is modified (e.g., after the modified information is written back to the on-chip memory 230 from a level closer to the processor), the unencrypted information must be encrypted before it is written back to a level farther from the processor. For example, the unencrypted information stored in the on-chip memory 230 can be encrypted, and the encrypted information can be written back to the external memory 240. As one example, the information stored in the on-chip memory 230 can be encrypted and written back to the external memory 240 when the on-chip memory 230 is being used at or near capacity and the information is spilled to the external memory 240 to make room for new information to be loaded onto the on-chip memory 230.

Information can be moved within the memory hierarchy 200 between the external memory 240 and the non-volatile storage 250. The information can be encrypted in the same format in both levels 240 and 250 so the transfers can include copying the information and not performing additional cryptographic operations. In a conventional memory hierarchy, external memory is used as main memory and performance penalties for accessing main memory are generally much smaller than when accessing a backing store on non-volatile storage, such as a hard disk drive. However, in the memory hierarchy 200, encrypting and decrypting the information copied between the external memory 240 and the on-chip memory 230 can add additional processing time to the transactions. Thus, the external memory 240 can potentially be viewed as being more like backing store than as main memory. In effect, the external memory 240 can be used as a first stage of backing store and the non-volatile storage can be used as a second (slower) stage of backing store. The backing store (also referred to as swap space) can be used to hold pages of memory that have not been recently used and that do not fit in the lower levels of the memory hierarchy.

Programs and their associated data that can fit within the on-chip levels of the memory hierarchy 200 can potentially execute in a similar amount of time as programs executing on a memory hierarchy without encryption. However, by using the memory hierarchy 200 the programs can be executed with greater security and/or privacy. On the other hand, programs that do not fit within the on-chip levels of the memory hierarchy 200 can potentially suffer a performance penalty associated with encrypting and decrypting information as it crosses the on-chip boundary. However, these larger programs can potentially be executed with greater security and/or privacy.

Figure 3:
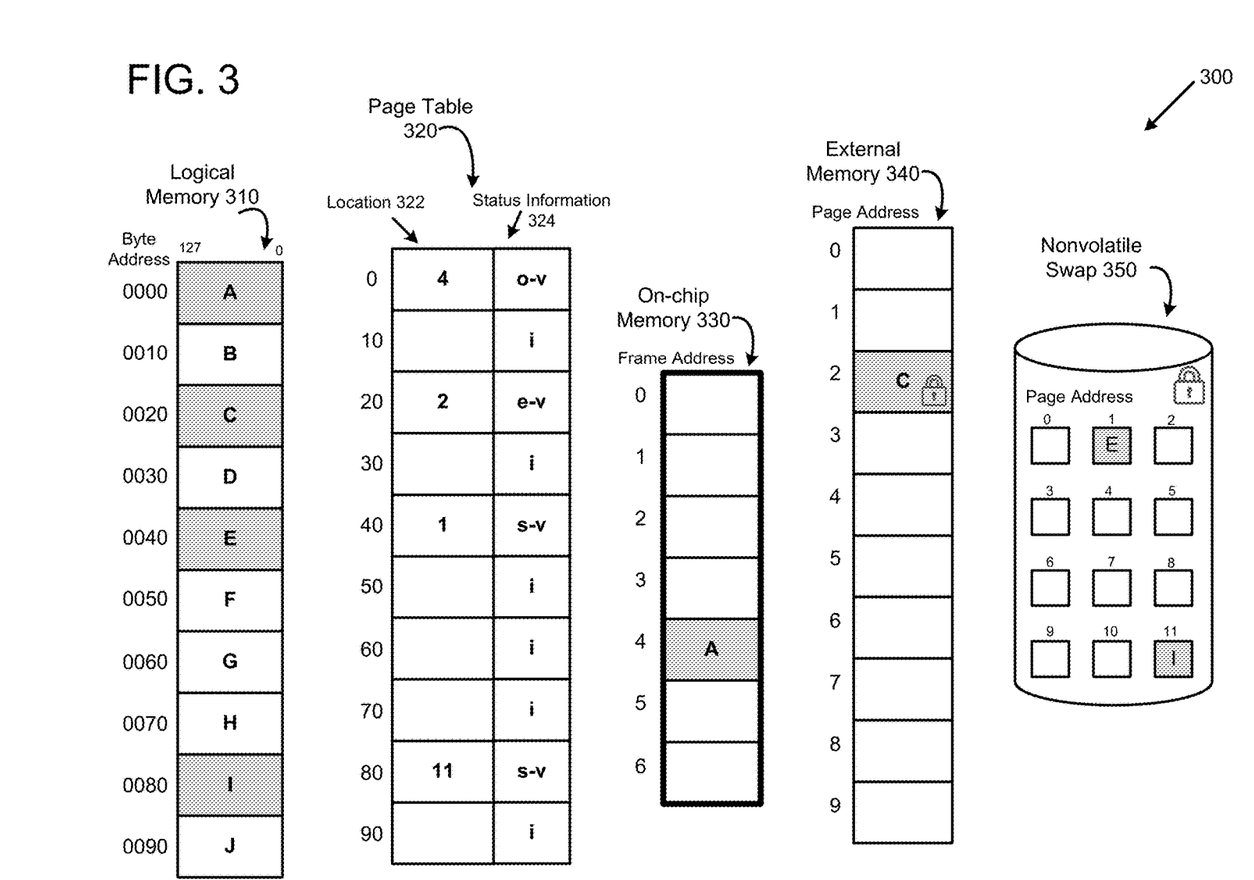
FIG. 3 illustrates an example of locating data associated with a logical address within different components of a memory hierarchy.

FIG. 3 illustrates an example of locating data associated with a logical address (such as a virtual address) within different components of a memory hierarchy 300. Virtual memory is a memory management technique that can enable the execution of programs that are only partially loaded into physical memory. Specifically, virtual memory is an abstraction of memory that treats the memory as a large uniform array of storage. The location of instructions and data of a program can be referenced using a virtual address of the virtual memory. The virtual addresses can be mapped to physical addresses that correspond to storage locations in physical memory. Virtual memory can be implemented using a combination of hardware and software. For example, kernel routines (such as a pager) of the operating system can be used to manage different virtual address spaces and can allocate virtual memory addresses to physical memory addresses. A memory management unit (MMU) of the processor can be used to automatically translate virtual addresses to the physical addresses supported by the processor. Additionally, the operating system can extend the virtual address space to a range exceeding the capacity of physical memory supported by the processor.

The virtual memory can be divided into blocks of contiguous virtual memory addresses called pages. For example, the logical memory 310 can be divided into pages that are 128 bits or 16 bytes wide. The pages can be identified by a starting address of the page, so the page with information "A" can be identified by the hexadecimal address "0000" and the page with information "B" can be identified by the hexadecimal address "0010," for example. Active pages (e.g., more recently used pages) can be stored in the levels of the memory hierarchy 300 closer to the processor and cold pages (e.g., unused or less recently used pages) can be stored in the levels of the memory hierarchy 300 farther from the processor. For example, the page with information "A" can be an active page that is stored in the on-chip memory 330 and the page with information "E" can be a cold page that is stored in the non-volatile swap space 350.

A page table 320 is a data structure that can be used to identify storage locations of pages in physical memory and/or backing store. The page table 320 can include multiple entries, where a given entry can provide a status of a page and can map a virtual address associated with the page to a physical address. The page table entries can be identified using a virtual address associated with the page, such as the starting address of the virtual page. As one example, a page table entry can include a location field 322 and a status information field 324. The status information field 324 can include information such as whether the page has been accessed and which level of the memory hierarchy is storing the most recent version of the page. A page that has not been accessed can be identified with an invalid ("i") status and a page that has a current copy of information for the page can be identified with a valid ("v") status. The level of the memory hierarchy storing the most recent version of the page can be indicated to a granularity that is visible to software. For example, software can observe that a page is stored in the on-chip memory 330, but the software may not be able to observe whether the page or a portion of the page is also stored a cache of the processor because the hardware data structures of the caches are generally not visible to software. As illustrated in FIG. 3, the status information field 324 can indicate whether the page is stored in the on-chip memory 330 ("o"), the external memory 340 ("e"), or the nonvolatile swap 350 ("s"). The location field 322 can indicate a physical location of the page within the level of the memory hierarchy. Thus, the information stored within the page table 320 can be used to translate between virtual addresses and physical addresses.

It should be noted that the different levels of the memory hierarchy can be accessed with different levels of granularity and addresses within the different levels can be relative to the granularity of access. For example, a processor can access data within a cache at a byte granularity (where a byte is eight bits). Thus, the logical memory 310 can be organized based on byte addresses. The granularity of transfers between one cache level and another cache level can be a cache line. For example, a cache line can be eight bytes or sixteen bytes. The sizes of cache lines in different cache levels can be the same or different. For example, a level one cache can have a cache line size of eight bytes and a level two cache can have a cache line size of sixteen bytes. Similarly, the granularity of transfers between a cache level and the on-chip memory 340 can be a cache line. The granularity of transfers between the on-chip memory 340 and the external memory 340 can be a page. In particular, the on-chip memory 340 can be divided into multiple frames, where each frame can store a page of information corresponding to a range of addresses. The information within the on-chip memory 340 can be located using a frame address corresponding to units of storage equal to a frame or by a byte address corresponding to units of storage equal to a byte. The cache lines in the level adjacent to the on-chip memory 340 can be smaller than the frame size and so the cache may copy a portion of a page to the cache. The granularity of transfers between the external memory 340 and the nonvolatile swap 350 can be a block. For ease of illustration, the block size, the page size, and the frame size are equal, but they can be different sizes.

As a specific example, the logical memory 310 includes information (such as instructions and/or data) A-J located in contiguous virtual byte hexadecimal addresses 0000-009F. Specifically, the information "A" is stored in the page with a starting virtual address of 0000, the information "B" is stored in the page with a starting virtual address of 0010, and so forth. The virtual pages (A, C, E, and I) that have been mapped to levels within the memory hierarchy 300 are shaded. The other virtual pages within the logical memory 310 have not been mapped to levels within the memory hierarchy 300. The page table 320 includes entries that map the virtual addresses to physical locations. Specifically, the entry 0 maps the page with a starting virtual address of 0 to the on-chip memory 330 at a frame address of 4. Thus, the information "A" can be stored at frame address 4 of the on-chip memory 330. The entry 10 indicates that the page with a starting virtual address of 10 has not been mapped to a physical address (the page is cold). The entry 20 maps the page with a starting virtual address of 20 to the external memory 340 at a page address of 2. The entry 40 maps the page with a starting virtual address of 40 to the nonvolatile swap 350 at a page address of 1. It should be noted that the pages associated with a given virtual address can be located in multiple levels of the memory hierarchy 300 concurrently. The page table 320 can indicate storage locations within all of the different levels or just the level closest to the processor, for example. As a specific example, if a storage location within the cold page starting with the virtual address of 0040, containing information "E," is accessed (e.g., read or written) by the processor, the page can be transferred from the non-volatile swap 350 to the external memory 340 (such as to page address 7) to the on-chip memory 330 (such as to frame address 0). The information of the page is encrypted during these transfers. The page can be decrypted while it is stored in the on-chip memory 330 and then transferred to the cache. If the processor only reads the information, the unencrypted information will be resident in the cache and the on-chip memory 330, and the encrypted information will be resident in the external memory 340 and the non-volatile swap 350. The page table 320 can be updated so that the entry 40 maps the page with a starting virtual address of 40 to the on-chip memory 330 at a frame address of 0. The entry 40 can also map the page to the external memory 340 at a page address of 7 and to the nonvolatile swap 350 at a page address of 1. If the processor writes or modifies the information at the virtual address 0040, then the copies of the information in the memory hierarchy 300 outside of the cache will hold stale or old versions of the information.

Figure 4:
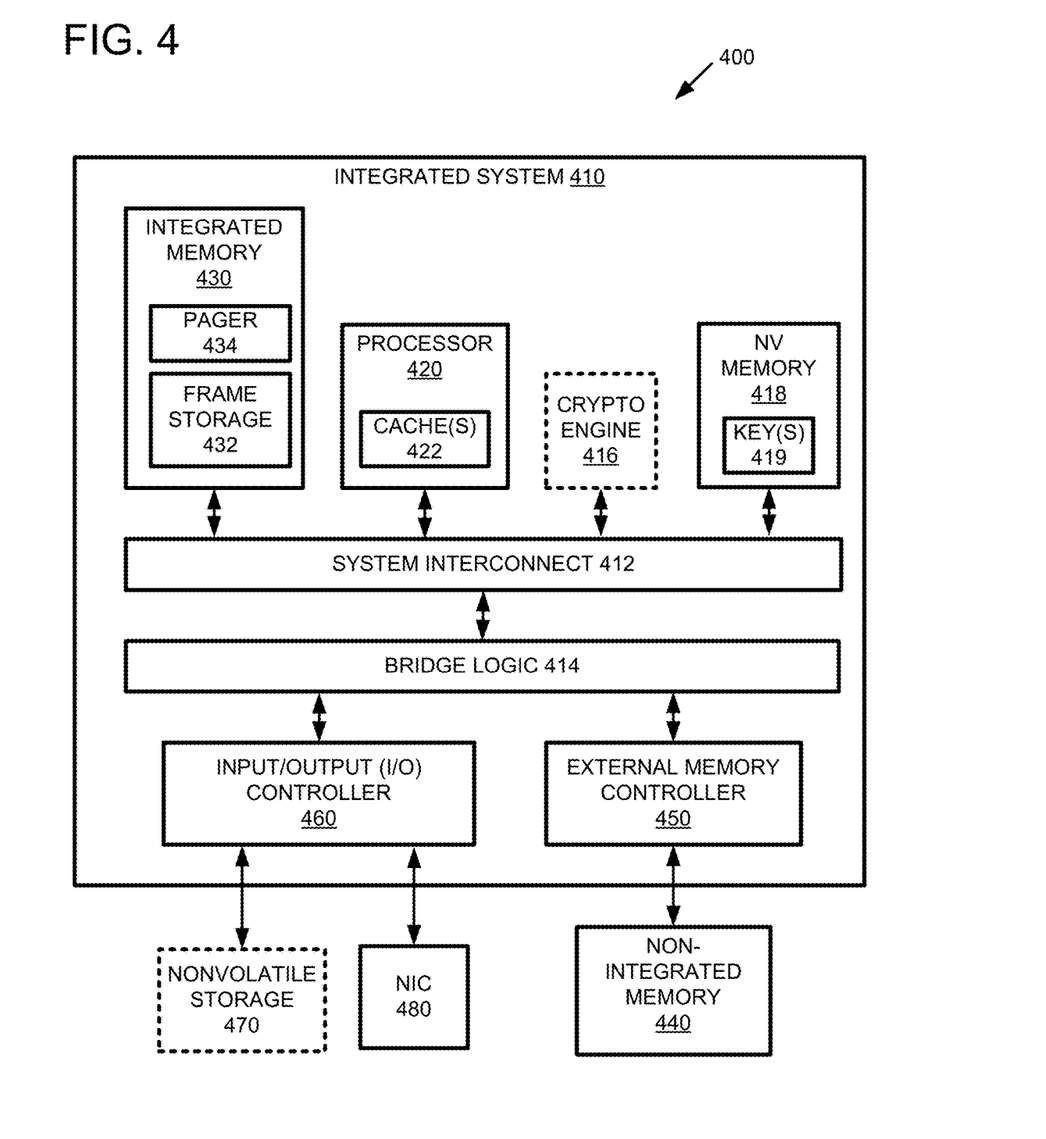
FIG. 4 is a system diagram showing an example of a computing system including a memory hierarchy that supports encrypted and unencrypted transfers of information.

FIG. 4 is a system diagram showing an example of a computing system 400 including a memory hierarchy that supports encrypted and unencrypted transfers of information. The computing system 400 includes an integrated system 410 and external components including a non-integrated memory 440, nonvolatile storage 470, and a network interface controller (NIC) 480. As one example, the integrated system 410 can be an integrated circuit, such as a system-on-chip (SOC) or field-programmable gate array (FPGA). As another example, the integrated system 410 can be a multi-chip module that is encapsulated in a relatively permanent encasing. For example, the multi-chip module can be encapsulated in plastic so that signal lines between the chips of the modules are not readily accessible. Generally, the integrated system 410 can include a group of components where the signal lines between the components are not readily accessible. Transfers between the different components of the integrated system 410 can be unencrypted. For example, transfers between different levels of the memory hierarchy that occur within the integrated system 410 can be sent unencrypted over signal lines that are not readily accessible. As a specific example, transfers across the system interconnect 412 can be sent unencrypted. The system interconnect 412 can be a bus, a point-to-point interconnect, a network on a chip, or other communication subsystem. Transfers between a given component of the integrated system 410 and a given external component can be sent encrypted over signal lines that are more accessible.

The integrated system 410 can include a processor 420 and one or more caches 422. The processor 420 can execute computer-executable instructions. For example, the computer-executable instructions can be part of a boot-loader, an operating system, an application program, and/or various other software routines. The computer-executable instructions can be stored in one or more of a nonvolatile (NV) memory 418, an integrated memory 430, and the non-integrated memory. As a specific example, the nonvolatile memory 418 can store boot software that is executed by the processor during a power-on or initialization sequence. The nonvolatile memory can be Flash, EEPROM, and/or Ferroelectric RAM, for example. The boot software can load other software, such as an operating system including a pager 434 and encryption and decryption routines. For example, the operating system can be loaded from the non-integrated memory 450. As another example, the boot software can include a pre-boot execution environment that enables an operating system to be loaded from a network connected to the NIC 480. The nonvolatile memory 418 can also store one or more keys 419 for accessing network-accessible services and/or for use during encryption and/or decryption of data being transferred outside of the integrated system 410 (such as to the non-integrated memory 440). Alternatively, the one or more keys 419 can be hardwired in logic of the integrated system 410.

The processor 420 can communicate with the external components through bridge logic 414. For example, higher speed low-overhead protocols can be used to communicate via the system interconnect 412 and lower speed higher-overhead protocols can be used to communicate with external peripherals. The processor 420 can offload some of the communication overhead using components of the integrated system 410. For example, an external memory controller 450 can be used to manage transfers between the processor 420 and the non-integrated memory 440. As one example, the non-integrated memory 440 can be DRAM and the information stored on the DRAM can be encrypted. For example, the information can be encrypted using one of the keys 419 stored in the nonvolatile memory 418. As another example, an input/output (I/O) controller 460 can be used to manage transfers between the processor 420 and the non-volatile storage 470 and the NIC 480. As specific examples, the nonvolatile storage 470 can include a hard disk drive, and the NIC 480 can communicate using Internet Protocol (IP) packets over Ethernet.

The computing system 400 includes a memory hierarchy that supports encrypted and unencrypted transfers of information. As one example, the levels of the memory hierarchy from closest to the processor 420 to farthest from the processor 420 can be the caches 422, the integrated memory 430, the non-integrated memory 440, and backing store on the nonvolatile storage 470. The levels of the memory hierarchy contained within the integrated system 410 can transfer information among each other using unencrypted formats. The levels of the memory hierarchy contained within the integrated system 410 can include the caches 422 and the integrated memory 430. The information stored on the levels of the memory hierarchy contained within the integrated system 410 can be stored unencrypted. The levels of the memory hierarchy external to the integrated system 410 can transfer information among each other using encrypted formats. The levels of the memory hierarchy external to the integrated system 410 can include the non-integrated memory 440 and swap store which can be located on the nonvolatile storage 470. The information stored on the levels of the memory hierarchy external to the integrated system 410 can be stored encrypted. Transfers between the integrated memory 430 and the non-integrated memory 440 can be encrypted. Specifically, encrypted information stored in pages of the non-integrated memory 440 can be transmitted to frames of the frame storage 432 of the integrated memory 430. The information stored in the frames of the frame storage 432 can be encrypted and transmitted to the pages of the non-integrated memory 440. The encryption and/or decryption can be performed using one or more of the keys 419 and software stored on the integrated memory 430 or the nonvolatile memory 418. Additionally or alternatively, the encryption and/or decryption can be performed using various hardware accelerators, such as a cryptographic (crypto) engine 416.

Example Methods of Using Encryption in a Computing System

Figure 5:
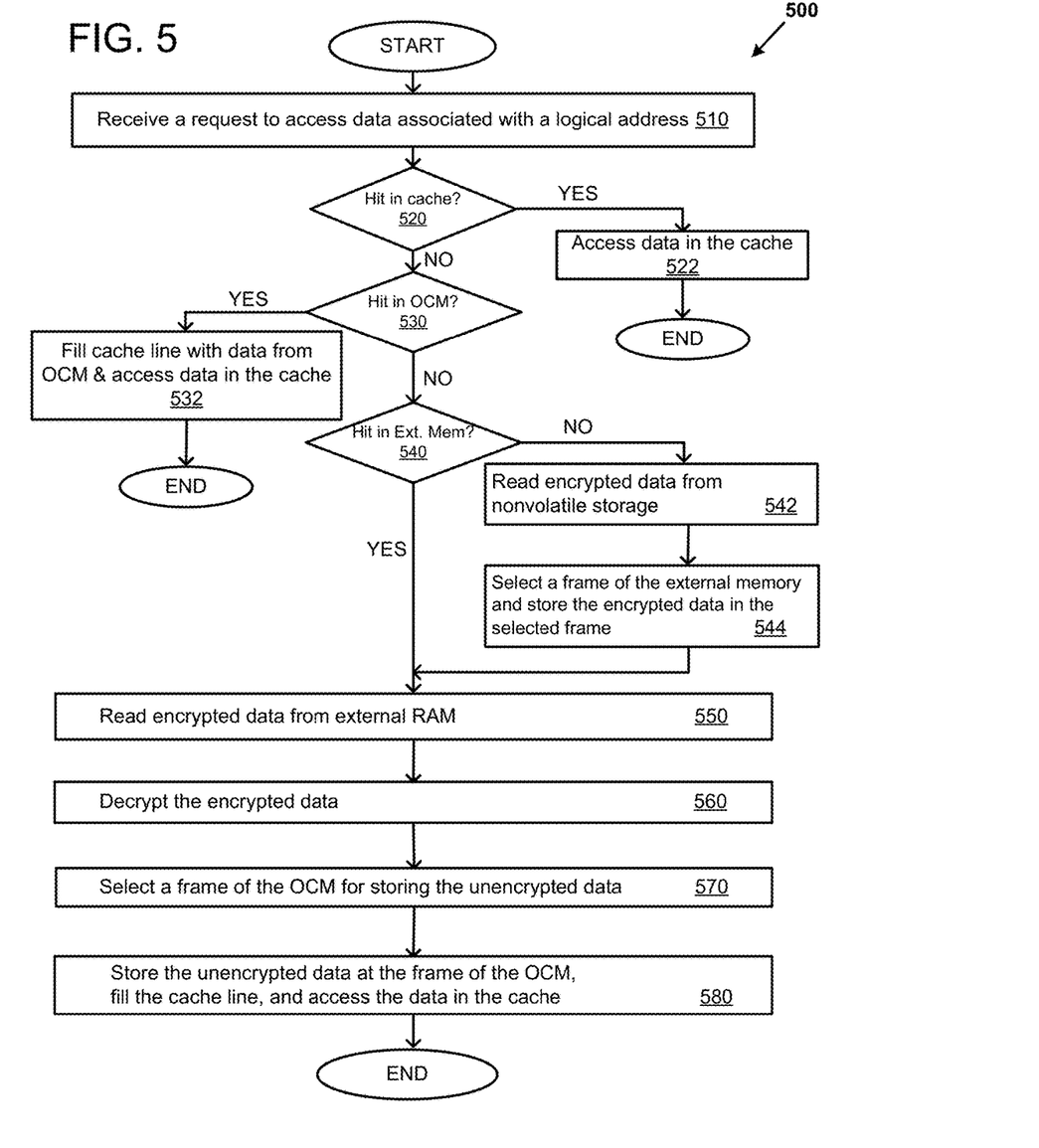
FIG. 5 is a flow diagram showing an example of a method for servicing a request to access data associated with a logical address.

FIG. 5 is a flow diagram showing an example of a method 500 for servicing a request to access data associated with a logical address. The method 500 can be implemented using hardware and/or software of a computing system including a memory subsystem that supports encrypted and unencrypted transfers of data. In particular, the computing system can include an integrated circuit comprising a processor, a cache, and an on-chip memory (such as a scratchpad RAM). The computing system can further include an external memory (such as a DRAM) that is separate from and in communication with the integrated circuit. The memory subsystem of the computing system can include the cache, the on-chip memory, the external memory, and associated logic (hardware and/or software) for reading, writing, and managing the memory.

At 510, a request to access data stored at a logical address can be received. The request can be generated by a processor. For example, the processor can issue a request to the memory subsystem to read data stored at a logical address or to write data to a logical address. The request can be received by the memory subsystem. The memory subsystem can use the logical address or a portion of the logical address as a key for searching a data structure, such as a page table, to determine a location or residency of data stored at the logical address. For example, the most significant bits of the logical address can be used to identify a page table entry specifying a matching physical address.

At 520, it can be determined if the data is resident in the cache. Specifically, it can be determined if a cache line associated with the logical address is resident in the cache. A cache line can store data for a range of contiguous addresses, and so if the logical address is within the range of addresses, the data is resident in the cache (referred to as a cache hit). If there is a cache hit, at 522, the data can be accessed in the cache. For example, the data can be read from the cache or the data can be written to the cache. If the data is not in the cache (referred to as a cache miss), the method 500 can continue at 530.

At 530, it can be determined if the data is resident in the on-chip memory (OCM). In other words, it can be determined if there is a hit in the on-chip memory. Specifically, it can be determined if a frame associated with the logical address is resident in the on-chip memory. A frame can store data for a range of contiguous addresses, and so if the logical address is within the range of addresses, the data is resident in the on-chip memory. If there is a hit, at 532, a cache line of the cache can be filled using the data stored in the matching frame of the on-chip memory and the data can be accessed in the cache. If the data is not in the on-chip memory, the method 500 can continue at 540.

At 540, it can be determined if the data is resident in the external memory. If the data is resident in the external memory, the method 500 can continue at 550. However, if the data is not resident in the external memory, at 542, encrypted data associated with the logical address can be read from nonvolatile storage. As one example, the encrypted data associated with the logical address may not have been accessed yet, such as when the logical address is associated with instructions of a program that have not been loaded yet. In this example, the encrypted data can be read from a storage location for the program on the nonvolatile storage. As another example, the encrypted data associated with the logical address may have been accessed earlier, but was moved to backing store. In this example, the encrypted data can be read from a swap space on the nonvolatile storage.

At 544, a page of the external memory can be selected for storing the encrypted data retrieved from the nonvolatile storage, and the retrieved encrypted data can be stored in the selected page of the external memory. As one example, a pager routine can maintain a pool of unused pages for storing encrypted data retrieved from the nonvolatile storage. When the pool of unused pages drops below a threshold number of pages, pages from the external memory can be selected to be copied to backing store on nonvolatile storage so that the pool can be increased. Various algorithms can be used to select pages to copy to backing store, such as least-recently-used, first-in first-out, not recently used, second chance, clock, and random. As another example, the pool of unused pages can be omitted and the page selected for storing the encrypted data can be selected from active pages. The active page can be selected using the same or similar algorithms described above for selecting pages to copy to backing store. The active page can be copied to the backing store, so that it will become a cold page, before the encrypted data from the nonvolatile storage overwrites the selected page.

At 550, the encrypted data can be read from the page of the external memory and transmitted on-chip. As one example, the encrypted data can be stored in a frame of the on-chip memory. At 560, the encrypted data can be decrypted using hardware and/or software. For example, the encrypted data can be decrypted using a cryptography engine of the computing system. At 570, a frame of the on-chip memory can be selected for storing the unencrypted data. For example, the frame for storing the unencrypted data can be the same frame as for storing the encrypted data. Thus, the encrypted data can be overwritten with the unencrypted data. Similar to the pages of the external memory, the frames of the on-chip memory can be selected from a pool of frames or from an active frame. As described in more detail further below with reference to FIG. 6, an active frame that is to be overwritten can be encrypted and copied to the external memory before it is overwritten. At 580, the unencrypted data can be stored at the selected frame of the on-chip memory. The unencrypted data stored at the selected frame of the on-chip memory can be used to fill the cache line associated with the logical address so that the data can be accessed in the cache.

Figure 6:
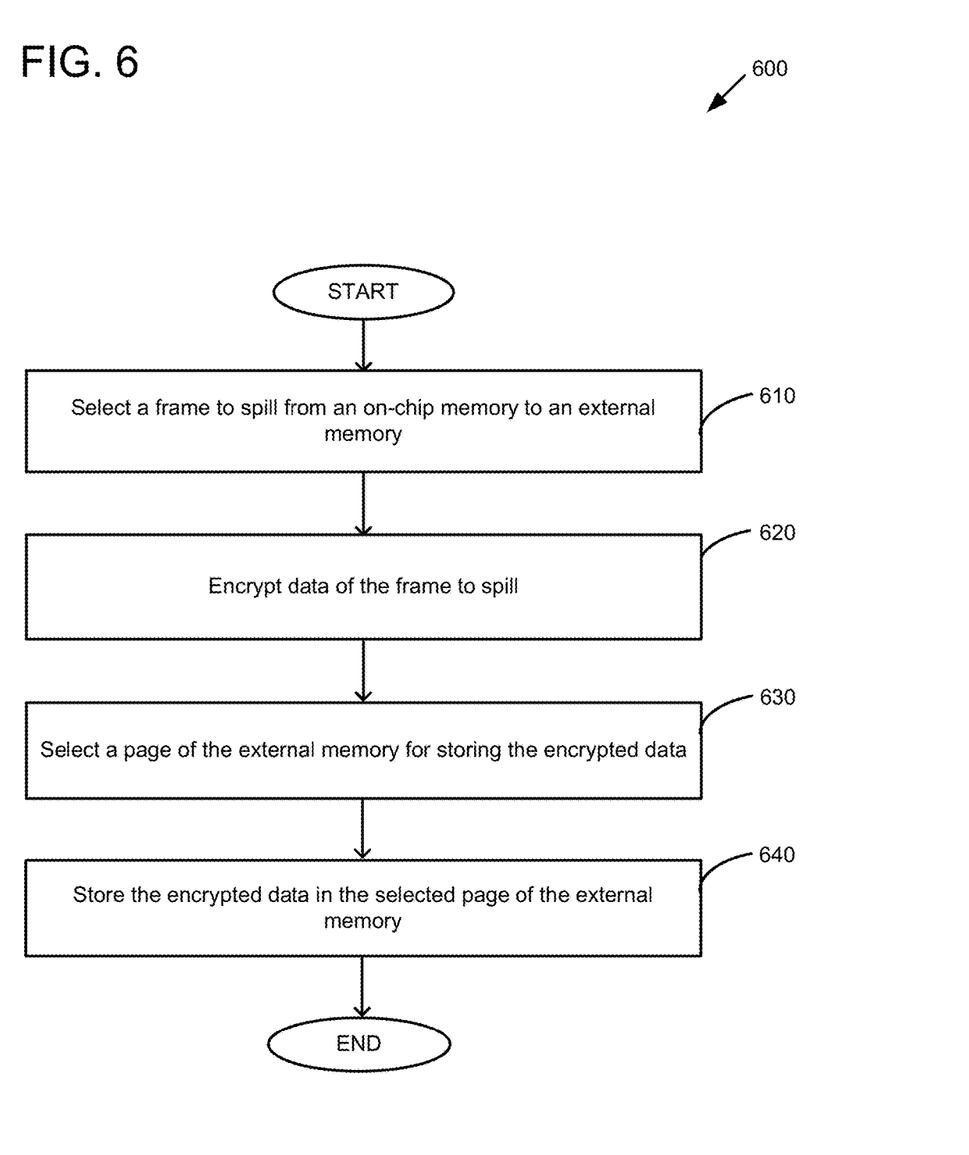
FIG. 6 is a flow diagram showing an example of a method of spilling a frame from an on-chip memory to an off-chip memory.

FIG. 6 is a flow diagram showing an example of a method 600 of spilling a frame from an on-chip memory to a page of an off-chip memory. A frame can be spilled from the on-chip memory when the data stored in the frame is removed from the on-chip memory to make room for different data. If the data to be removed was not modified since it was copied to the frame from an external memory, the data can be overwritten without losing any information. However, if the data to be spilled was modified, then the modified data can be encrypted and the encrypted data can be written to the external memory before the frame of the on-chip memory is overwritten so that the modifications can be saved.

At 610, a frame can be selected to be spilled from the on-chip memory to the external memory. As one example, the frames can be used in a first-in first-out order. Thus, the frame holding the oldest retrieved data can be used for storing new data, and the oldest retrieved data can be spilled. As another example, the access pattern of the frames can be recorded and the data in the least recently used frame can be spilled. As another example, a frame can be randomly selected to be spilled.

At 620, the data of the selected frame can be encrypted. For example, the data of the frame and a key can be used as inputs to a cryptographic algorithm to generate the encrypted data. The key can be stored in an on-chip non-volatile memory or can be sent encrypted over a network connected to the computing system so that the key cannot readily be observed from outside of the integrated system. Various cryptographic algorithms can be used for the encryption, such as Advanced Encryption Standard (AES), Data Encryption Standard (DES), triple-DES, Twofish, Serpent, Blowfish, and CAST-128. The encryption can be performed using algorithms implemented in software or by using a hardware accelerator of the integrated system.

At 630, a page of the external memory can be selected for storing the encrypted data. For example, the logical address associated with the data to be spilled can already be allocated to a physical page in the external memory. The page table can specify different levels of the memory hierarchy where the logical address can be mapped to. For example, a page that is copied from backing store can be resident on the non-volatile storage, the external memory, the on-chip memory, and the caches when the data is accessed by the processor. The data can be modified locally in the cache and not written back until a conflict arises in the cache and the data is evicted to the on-chip memory. The modified data can reside in the on-chip memory until the space is needed for different data in the on-chip memory. Because the levels of the memory hierarchy typically get larger as the levels get farther from the processor, there can already be a storage location allocated in the level farther away for the spilled data and the page table can specify where the storage location is located. Alternatively, if there is not a storage location already allocated for the spilled data, a storage location can be selected from a pool of unused pages or an active page can be selected to be replaced (potentially causing a cascade of spilled data through the memory hierarchy levels).

At 640, the encrypted data can be stored in the selected page of the external memory. Specifically, the encrypted data can be transmitted from the integrated system to the external memory for storage at the address of the selected page.

Figure 7:
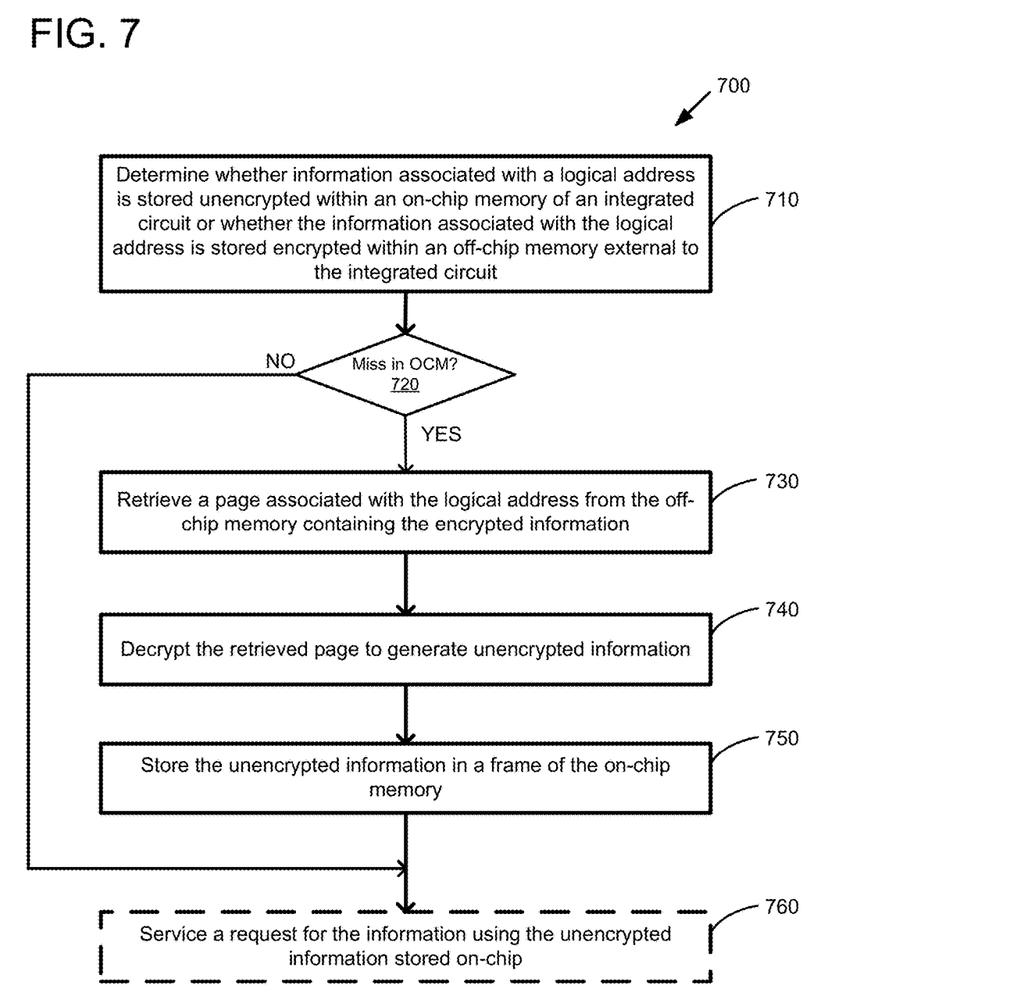
FIG. 7 is a flow diagram showing an example of a method of managing a memory hierarchy of a computing system.

FIG. 7 is a flow diagram showing an example of a method 700 of managing a memory hierarchy of a computing system. The computing system can include an integrated circuit comprising an on-chip memory. The computing system can further include an off-chip memory external to the integrated circuit.

At 710, it can be determined whether information associated with a logical address is stored unencrypted within the on-chip memory or whether the information associated with the logical address is stored encrypted within the off-chip memory. For example, a data structure, such as a page table can be used to map logical addresses to storage locations in a memory hierarchy comprising the on-chip memory and the off-chip memory. The mappings stored in the page table can be used to determine whether the information associated with the logical address is stored within the on-chip memory or the off-chip memory. If the information is resident in the on-chip memory (a hit), the method 700 can continue at 760. However, if the information is not resident in the on-chip memory (a miss), the method 700 can continue at 730.

At 730, a page associated with the logical address can be retrieved from the off-chip memory containing the encrypted information. For example, one or more requests can be issued to the off-chip memory to read the information stored within the range of addresses of the page.

At 740, the retrieved page can be decrypted to generate unencrypted information. Decrypting the retrieved page can include using an on-chip cryptography accelerator to perform the decryption of the information. Additionally or alternatively, the retrieved page can be decrypted using software.

At 750, the unencrypted information can be stored in a frame of the on-chip memory. The frame of the on-chip memory can be selected from a pool of non-overlapping frames of the on-chip memory. For example, the selected frame of the on-chip memory can be a least-recently-used frame from the pool of frames of the on-chip memory. Storing the unencrypted information in the frame of the on-chip memory can cause the prior data stored in the frame to be to be spilled prior to overwriting the prior data. Spilling the prior data can include encrypting the prior data and writing the encrypted information to a page of the off-chip memory. Encrypting the prior data can include using the on-chip cryptography accelerator to perform the encryption of the information. Additionally or alternatively, the retrieved page can be decrypted using software.

At 760, a request for the information can be serviced using the unencrypted information stored in the on-chip memory. For example, a processor can read the information or the processor can overwrite the information.

Figure 8:
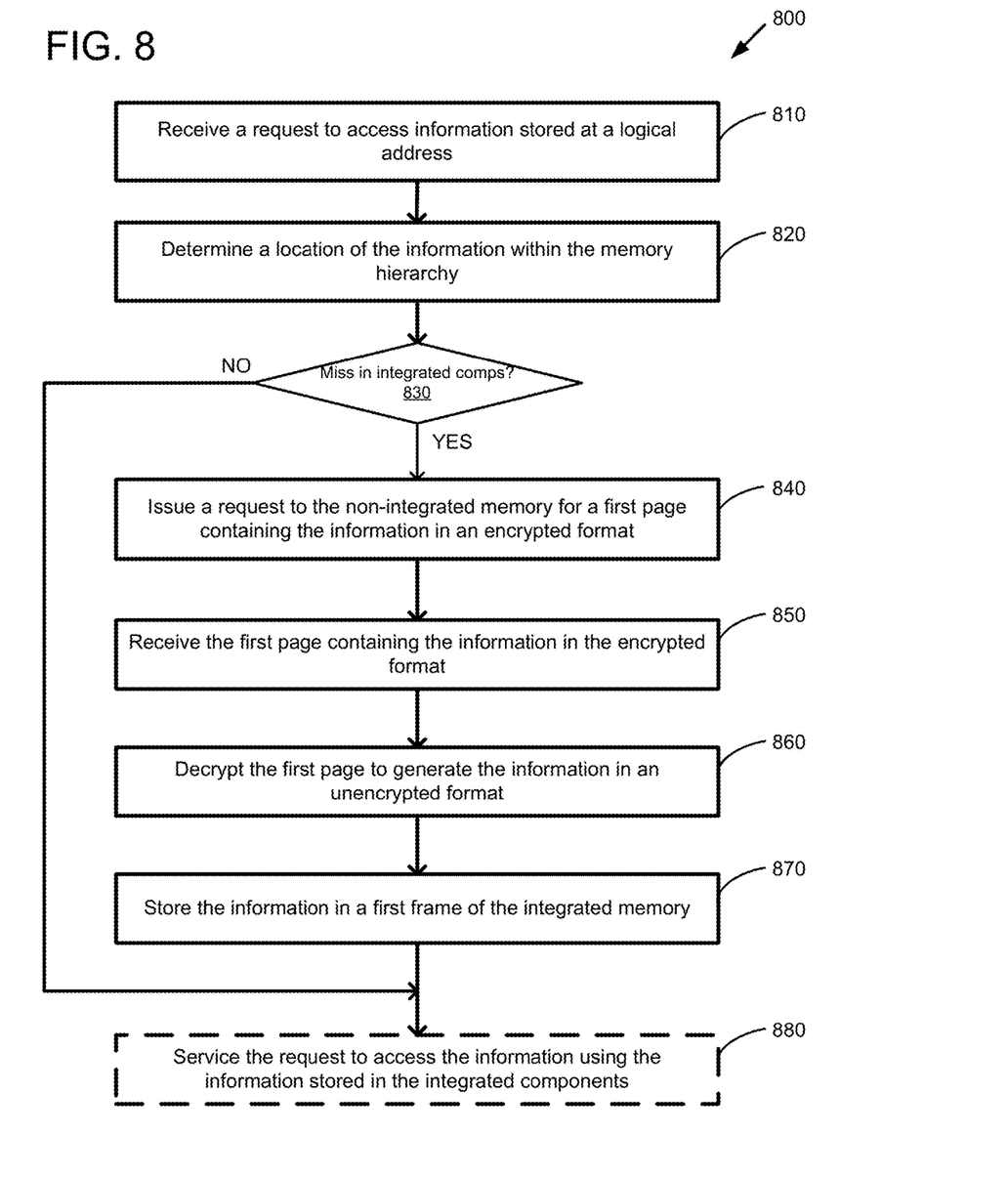
FIG. 8 is a flow diagram showing another example of a method of managing a memory hierarchy of a computing system.

FIG. 8 is a flow diagram showing another example of a method 800 of managing a memory hierarchy of a computing system. The computing system comprises a cache and an integrated memory encapsulated within a package and a non-integrated memory outside of the package. As one example, the cache and the integrated memory can be incorporated into a single integrated circuit. The memory hierarchy comprises the cache, the integrated memory, and the non-integrated memory.

At 810, a request can be received to access information stored at a logical address. For example, the logical address can be virtual address. A request to access information can be a read request, a write request, or a read-modify-write request, for example.

At 820, a location of the information within the memory hierarchy can be determined. Determining the location of the information within the memory hierarchy can include searching for a page table entry associated with the logical address of the information. The page table entry can include a mapping from a logical address or a range of logical addresses to one or more physical addresses associated with one or more different components. As a specific example, a given page table entry can include a mapping from a logical address to a physical address of the integrated memory, a physical address of the non-integrated memory, and a physical address of the backing store when the information is stored in those three levels of the memory hierarchy. The mapping between the different levels can be fully or partially fixed (such as when a physical address of one level can only be mapped to one or a set of physical addresses of another level) or the mapping can be fully associative where a physical address of one level can be mapped to any physical addresses of another level.

At 830, it can be determined whether the information is located within the integrated components (e.g., the cache and the integrated memory). If the information is located within either the cache or the integrated memory, the method 800 can continue at 880. However, when the information is located in the non-integrated memory and not in the integrated memory or the cache, the method 800 can continue at 840.

At 840, a request can be issued to the non-integrated memory for a first page containing the information in an encrypted format. At 850, the first page containing the information in the encrypted format can be received. At 860, the first page can be decrypted to generate the information in an unencrypted format. Decryption can be performed in software and/or by using a hardware cryptography accelerator of the integrated system. The decryption can occur within the integrated system so that unencrypted information is not readily observable outside of the integrated system.

At 870, the information can be stored in a first frame of the integrated memory. Storing the information in the first frame of the integrated memory can include selecting the first frame from a plurality of frames of the integrated memory. For example, the first frame can be selected from a pool of unused frames or the first frame can be selected from the active frames. If an active frame is selected, any modified data of the active frame can be spilled to the non-integrated memory before the information is stored in the first frame of the integrated memory. As one example, the spilled active frame can be a least-recently-used frame from the plurality of frames of the integrated memory. The page table entry associated with the logical address of the information can be updated to indicate that the information is stored in the integrated memory when the information is stored in the first frame of the integrated memory.

At 880, the request to access the information can be serviced using the information stored in the integrated memory. For example, the information stored in the integrated memory can be used to fill a cache line and a processor can read or write to the cache line.

Figure 9:
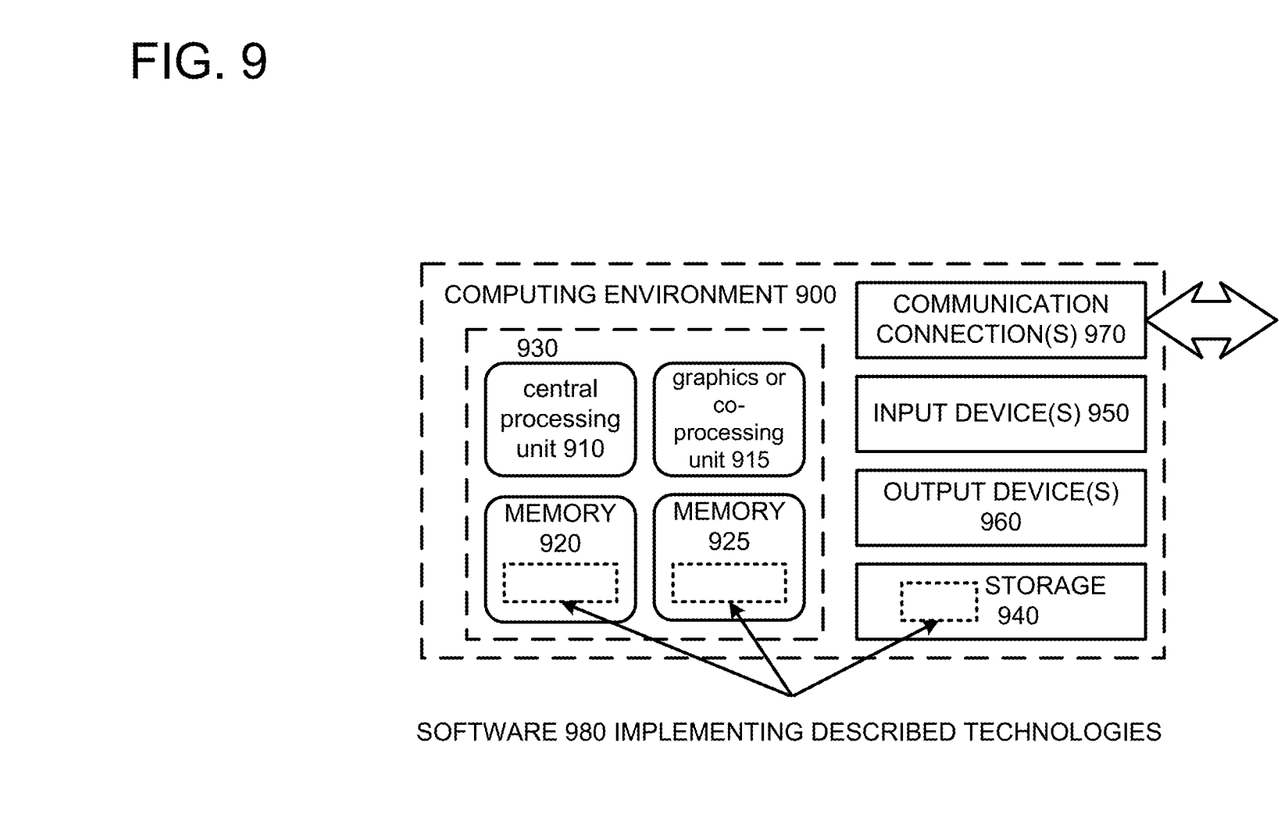
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, SRAM, DRAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A computer system comprising:
    a scratchpad memory for storing unencrypted data;
    an off-chip memory for storing encrypted data; and
    a processor in communication with the scratchpad memory and the off-chip memory, wherein the processor and the scratchpad memory are integrated within a single integrated circuit, the processor configured to:
        receive a request to access information stored at an address within a memory hierarchy of the computer system, the memory hierarchy comprising an unencrypted level including an on-chip cache, an encrypted level including the off-chip memory, and the scratchpad memory, the scratchpad memory different from the on-chip cache;
        determine whether the information corresponding to the address is resident on the integrated circuit;
        in response to determining the information is not resident on the integrated circuit:
            issue a read request to the off-chip memory for a page of encrypted information, the page associated with the address within the memory hierarchy;
            receive the page of encrypted information from the off-chip memory in response to the read request;
            decrypt the page of encrypted information to generate unencrypted information; and
            store the unencrypted information in a frame of the scratchpad memory and fill the cache line associated with the address using the unencrypted information.

2. The computer system of claim 1, wherein storing the unencrypted information in the frame of the scratchpad memory comprises selecting the frame from a plurality of frames of the scratchpad memory.

3. The computer system of claim 1, wherein the processor is further configured to:
    select another frame of the scratchpad memory to store in the off-chip memory;
    encrypt the information of the other frame; and
    transmit a request to write the encrypted information of the other frame.

4. The computer system of claim 1, wherein determining where information corresponding to the address within the memory hierarchy is resident comprises searching for a page table entry associated with the address.

5. The computer system of claim 1, further comprising a hardware cryptography engine in communication with the processor and integrated within the single integrated circuit, and wherein the hardware cryptography engine is used to decrypt the page of the encrypted information to generate the unencrypted information.

6. An integrated circuit comprising:
    an on-chip memory; and
    a processor, wherein the processor is configured to:
        determine whether information associated with a logical address is stored unencrypted within the on-chip memory on the integrated circuit or whether the information associated with the logical address is stored encrypted within an off-chip memory external to the integrated circuit, the on-chip memory being an intermediary layer of a memory hierarchy between a cache of the processor and the off-chip memory; and if the information is not stored unencrypted on the integrated circuit and is stored encrypted within the off-chip memory:

retrieve a page associated with the logical address from the off-chip memory containing the encrypted information;

decrypt the retrieved page to generate unencrypted information; and store the unencrypted information in a first frame of the on-chip memory.

7. The integrated circuit of claim 6, wherein the first frame of the on-chip memory is selected from a pool of non-overlapping frames of the on-chip memory.

8. The integrated circuit of claim 6, wherein the first frame of the on-chip memory is a least-recently-used frame from a pool of frames of the on-chip memory.

9. The integrated circuit of claim 6, wherein the integrated circuit is further configured to:

spill a second frame of the on-chip memory to the off-chip memory by encrypting information of the second frame and writing the encrypted information to a second page of the off-chip memory.

10. The integrated circuit of claim 9, wherein spilling the second frame of the on-chip memory comprises using an on-chip cryptography accelerator to perform the encryption of the information.

11. The integrated circuit of claim 6, wherein a page table is used to map logical addresses to storage locations in the memory hierarchy, and wherein the page table is used to determine whether the information associated with the logical address is stored within the on-chip memory or the off-chip memory.

12. A method of managing a memory hierarchy of a computing system, the computing system comprising a cache and an integrated memory encapsulated within a package and a non-integrated memory outside of the package, the memory hierarchy comprising the cache, the integrated memory, and the non-integrated memory, the integrated memory different from the cache, the method comprising:

receiving a request to access information stored at a logical address;

determining whether the information is resident within the cache or the integrated memory encapsulated within the package;

if the information is located in the non-integrated memory and not in the integrated memory or the cache:

issuing a request to the non-integrated memory for a page containing the information in an encrypted format;

receiving the page containing the information in the encrypted format;

decrypting the page to generate the information in an unencrypted format; and storing the information in a frame of the integrated memory.

13. The method of claim 12, wherein determining the location of the information within the memory hierarchy comprises searching for a page table entry associated with the logical address of the information.

14. The method of claim 13, further comprising updating the page table entry associated with the logical address of the information to indicate that the information is stored in the integrated memory when the information is stored in the frame of the integrated memory.

15. The method of claim 12, wherein storing the information in the frame of the integrated memory comprises selecting the frame from a plurality of frames of the integrated memory.

16. The method of claim 15, wherein storing the information in the frame of the integrated memory comprises overwriting a least-recently-used frame from the plurality of frames of the integrated memory.

17. The method of claim 12, further comprising:

selecting another frame of the integrated memory to store in the non-integrated memory;

encrypting information of the other frame; and transmitting a request to write the encrypted information of the other frame to the non-integrated memory.

18. The method of claim 12, wherein the cache and the integrated memory are incorporated into a field-programmable gate array.

19. The method of claim 12, wherein decrypting the page to generate the information in the unencrypted format comprises using a software cryptography engine.

20. The method of claim 12, wherein the cache and the integrated memory are incorporated into a single integrated circuit.

* * * * *